United States Patent [19]
Sato et al.

[11] Patent Number: 5,637,284
[45] Date of Patent: Jun. 10, 1997

[54] PROCESS FOR CONTINUOUS REFINING OF QUARTZ POWDER

[75] Inventors: Tatsuhiro Sato; Hiroyuki Watanabe, both of Takefu, Japan; Werner Ponto, Bruchköbel, Germany

[73] Assignees: Heraeus Quarzglas GmbH, Hanau, Germany; Shin-Etsu Quartz Products, Co., Ltd., Tokyo, Japan

[21] Appl. No.: 620,447

[22] Filed: Mar. 22, 1996

[30] Foreign Application Priority Data

Apr. 10, 1995 [EP] European Pat. Off. .............. 95105409

[51] Int. Cl.$^6$ .............. C03B 32/00; C01B 33/18
[52] U.S. Cl. .............. 423/340; 106/482; 106/488
[58] Field of Search .............. 423/340, 335; 106/482, 488

[56] References Cited

U.S. PATENT DOCUMENTS

| | | |
|---|---|---|
| 2,070,161 | 2/1937 | Flinn . |
| 2,233,695 | 3/1941 | Crew .............. 423/340 |
| 3,383,438 | 5/1968 | Allegrim et al. .............. 106/488 |
| 4,956,059 | 9/1990 | Englisch et al. . |
| 4,983,370 | 1/1991 | Loritsch et al. .............. 423/340 |

FOREIGN PATENT DOCUMENTS

| | | |
|---|---|---|
| 4050132 | 2/1992 | Japan . |
| 325386 | 2/1930 | United Kingdom .............. 423/340 |

*Primary Examiner*—Ngoc-Yen Nguyen
*Attorney, Agent, or Firm*—Felfe & Lynch

[57] ABSTRACT

A rotating cylindrical quartz glass tube is partitioned into at least 3 chambers comprising a pre-heating chamber, a reaction chamber, and a gas desorption chamber. The process comprises pre-heating the starting quartz powder by continuously supplying it into the pre-heating chamber, refining the powder by transferring it into the reaction chamber in which the powder is brought into contact with a chlorine-containing gas atmosphere, and transferring the powder into the gas desorption chamber; the chambers may be partitioned using a sectioning plate having an opening. Alkali metal elements such as sodium and potassium, as well as transition metal elements such as iron, copper, chromium, and nickel are removed from a powder of naturally occurring quartz. The process also removes alkaline earth metal elements such as magnesium and calcium. Furthermore, it is of high productivity because it can be operated continuously to yield high purity quartz powder at a low cost.

9 Claims, 1 Drawing Sheet

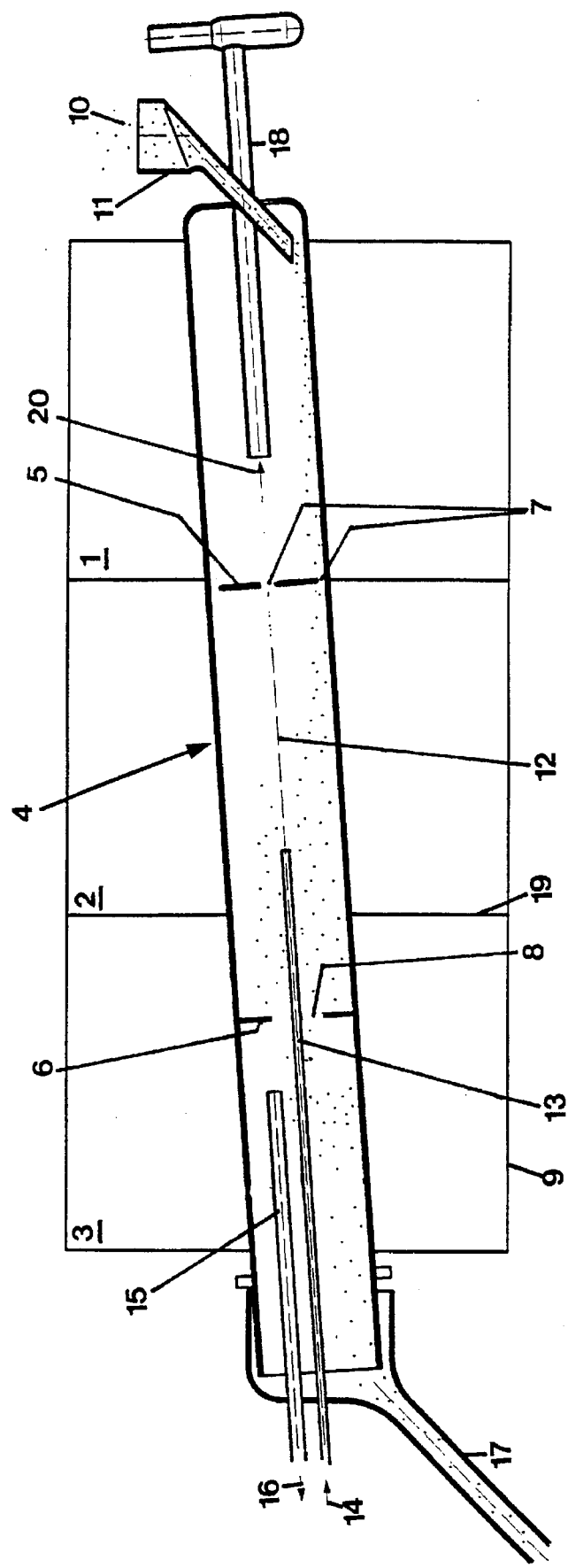

PROCESS FOR CONTINUOUS REFINING OF QUARTZ POWDER

BACKGROUND OF THE INVENTION

The present invention relates to an advanced process for refining (the term "purification" is used sometimes as a synonym for "refining" hereinafter) quartz powder. More specifically, the present invention relates to a process for continuously refining quartz powder to provide a high purity starting material suitable for use in the fabrication of silica glass vessels and jigs that are essential in the semiconductor industry, and which is also suitable for silica fillers to be added into plastic packages.

Quartz powder, and particularly the powder of naturally occurring quartz, has been utilized heretofore as a starting material of quartz glass materials for fabricating silica glass vessels or jigs, as well as of silica fillers to be added into plastic packages such as ICs and LSIS. However, it has been found that those quartz powders contain various types of impurities, and that the impurities unfavorably influence the semiconductor products. Attempts have been made to purify the quartz powder accordingly. For instance, the specification of U.S. Pat. No. 4,956,059 discloses a process which comprises bringing the starting quartz powder into contact with a chlorine-containing gas atmosphere in a temperature range of from 700° to 1,300° C. in a reaction tube while applying voltage thereto. JP-A-48-69794 (the term "JP-A-" as referred herein signifies "an unexamined published Japanese patent application") discloses refining a powder of rock crystal by bringing it into contact with chlorine or a gas containing chlorine at a temperature in a range of from 700° to 1,300° C.

The purification process as disclosed in the aforementioned U.S. Pat. 4,956,059 is certainly a method for refining naturally occurring quartz to a high level of purity. However, the whole process is costly not only because it comprises steps of batch processes, but also because voltage is applied to the reaction tube. Concerning the purification process disclosed in JP-A-48-69794, it was found impossible to sufficiently purify a powder of a naturally occurring quartz. More specifically, alkali metal elements, alkaline earth metal elements, transition metal elements, radioactive elements, etc., that are inherent in the naturally occurring quartz were not sufficiently excluded therefrom. In particular, alkaline each metal elements and transition metal elements were found to remain in quartz after the purification according to this process. Accordingly, it was not possible to achieve a high purity quartz required in the present day semiconductor industry.

SUMMARY OF THE INVENTION

A high purity quartz powder, particularly a highly purified quartz powder free of alkali metal elements, alkaline metal elements, and transition metal elements can be obtained at a low cost by providing at least three chambers, i.e., a pre-heating chamber, a reaction chamber, and a gas desorption chamber inside a rotating cylindrical quartz tube, and transferring the starting quartz powder sequentially from a chamber to another. The present invention has been accomplished based on these findings. Accordingly, the present invention aims to accomplish the following objects:

provide a process for continuously refining quartz powder to thoroughly remove impurities affecting silicon wafers and the like from the quartz powder; and provide a process for refining quartz which enables low cost production of high purity quartz powder.

The quartz powder as referred herein encompasses a powder composed of particles having a grain diameter in the range of from about 106 to 250 μm, which is obtained by subjecting naturally occurring quartz, rock crystal, silica rock, or synthetic quartz to an ordinary size reduction process and classification. As a matter of course, quartz may be heated to facilitate the size reduction. A fine quartz powder composed of particles smaller than the defined range is not suitable for the fabrication of silica glass; on the contrary, a powder composed of particles larger than the aforementioned range is not preferred because purification would be effected only insufficiently.

The refining process according to the present invention comprises purifying the quartz powder by continuously transferring quartz powder inside a rotating cylindrical quartz glass tube (referred to hereinafter as a rotary kiln). The inside of the rotary kiln is separated into at least three chambers, and the starting quartz powder is finally refined after it is tumbled and transferred sequentially over the chambers, i.e., a pre-heating chamber, a reaction chamber, and a gas desorption chamber. The chambers provided inside the rotary kiln are preferably three, i.e., the pre-heating chamber, the reaction chamber, and the gas desorption chamber, and are preferably separated with sectioning plates each having an opening. Because the rotary kiln is tilted and rotated, the quartz powder can be tumbled and transferred sequentially from a chamber to another. The rotary kiln is rotated at a rate of from 1 to 5 rpm, and preferably, at a rate of from 2 to 4 rpm. The tilting angle of the kiln is selected in accordance with the amount, the quality, etc., of the quartz powder to be processed.

The sectioning plate above is made of quartz glass. The relative aperture of the opening that is provided in the plate is selected depending on the granularity, the quality, etc., of the starting quartz powder so that the ratio may be in a range of from 10 to 40% of the entire area of the sectioning plate. In particular, the aperture ratio of the opening is preferably selected in such a range that the opening is substantially clogged by the tumbling quartz powder during the refining process. The aforementioned "substantially dogged by the tumbling quartz powder" means that the opening is shut by the powder in such a manner that the chlorine-containing gas would not flow inside the gas desorption chamber from the free area of the opening. By maintaining this state, the re-adhesion of chlorine-containing gas molecules on purified quartz powder can be prevented from occurring. A higher refining efficiency can be achieved in this manner.

An inlet for feeding the starting material as well as an outlet for the exhaust of the chlorine-containing gas are provided to the pre-heating chamber inside the rotary kiln. An inlet of the pipe for supplying reactive gas is provided to the reaction chamber to supply the chlorine-containing gas. An exhaust port for discharging the desorption gas and an outlet for the quartz powder product are provided to the gas desorption chamber. Thus, the refined quartz powder are discharged while driving out the desorption gas. An evacuation means may be connected to the desorption gas exhaust pipe to accelerate the desorption of the gas.

The quartz powder introduced into the rotary kiln through the material feed pipe is heated to at least 800° C. inside the pre-heating chamber, and transported to the reaction chamber. The quartz powder is then brought into contact with the chlorine-containing gas supplied from the reaction gas supply pipe at a temperature in a range of from 1,000° to 1,300° C. for the purification thereof. The thus purified quartz powder is tumbled and transferred into the gas desorption chamber heated to at least 800° C., so that the adsorbed gas might be released from the surface of the quartz powder, and that hot quartz powder might be gradually cooled.

In the refining process above, purification would not proceed favorably in the reaction chamber if the temperature of the pre-heating chamber should be lower than 800° C. If the temperature of the reaction chamber should be lower than 1,000° C., the efficiency of purification would be low. In such a case, the targeted level of purity would not be achieved. The entire apparatus would not withstand a temperature of the reaction chamber exceeding 1,300° C. The chlorine-containing gas is previously heated to the vicinity of the reaction temperature before introducing it into the reaction chamber. By preventing cooling of the quartz powder in this manner, the efficiency of purification can be maintained at a high level. The chlorine-containing gas can be introduced into the reaction chamber by, for instance, introducing it directly after heating it outside the rotary kiln. Otherwise, it may be passed through a reaction gas supply pipe placed inside the gas desorption chamber before introducing it into the reaction chamber, so that the chlorine-containing gas might be heated inside the gas desorption chamber.

The chlorine-containing gas for use in the refining process affording to the present invention include a mixed gas of gaseous hydrogen chloride and gaseous chlorine, or a mixed gas comprising an inert gas such as gaseous nitrogen in addition thereto. Particularly preferred is a mixed gas comprising gaseous hydrogen chloride and gaseous chlorine at a mixing ratio of the former to the latter of from 2 to 20, and more preferably, from 4 to 13. If the mixing ratio of gaseous hydrogen chloride and gaseous chlorine should fall outside the aforementioned range, alkali metal elements and other transition metal elements would not be removed sufficiently from the quartz powder.

The process rate of the refining according to the present invention is in a range of from 1 to 20 kg/hour, and preferably, in a range of from 1 to 10 kg/hour. If the rate should be too low as to fall below the defined range, alkali metal elements would not be removed rapidly from the quartz powder. To increase the efficiency of purification, the refining process according to the present invention can be repeated for a plurality of times. This is particularly suitable for improving the efficiency for removing transition metal elements from quartz powder.

The refining process according to the present invention is suitable for producing pure quartz powder devoid of not only alkali metal elements and transition metal elements, but also alkaline earth metal elements. Conventional methods and processes failed to sufficiently remove the alkaline earth metal elements. More specifically, the process according to the present invention provides a quartz powder containing sodium at a concentration as low as 10 ppb or less, iron at 70 ppb or less, copper and nickel each at 0.3 ppb or less, and chromium at 0.5 ppb or less.

The present invention is described in detail below referring to some examples. However, the present invention is not limited thereto.

BRIEF DESCRIPTION OF THE DRAWINGS

FIG. 1 is a cross sectional view of a device for refining quartz powder.

DESCRIPTION OF THE PREFERRED EMBODIMENTS

EXAMPLE 1

A pre-heating chamber 1, a reaction chamber 2, and a gas desorption chamber 3 are provided inside a quartz glass rotary kiln 4 having an inner diameter of 100 mm and 2,000 mm in length. The three chamber 1; 2; 3 are partitioned by quartz glass sectioning plates 5; 6. An opening 7 is provided to the sectioning plate 5 between the pre-heating chamber 1 and the reaction chamber 2 at an aperture ratio of 15%, and another opening 8 was provided to the sectioning plate 6 between the reaction chamber 2 and the gas desorption chamber 3 at an aperture ratio of 35%. The resulting rotary kiln 4 was set by tilting it at an angle of about 4° inside an heater 9. The heater 9 is positioned into three heating zones as indicated by vertical lines 19.

In the following a method to refine quartz powder 10 will be described more clearly. Powder 10 of naturally occurring quartz composed of grains from 106 to 250 μm in diameter was supplied continuously via a feeding hopper 11 to the rotary kiln 4 above at a rate of about 1.5 kg per hour. During supplying of the powder 10 the rotary kiln 4 is rotated around its central axis 12. Inside the preheating chamber 1 the quartz powder 10 might be heated at about 1,000° C. by the heater 9 placed on the outer periphery of the kiln 4. A gas desorption pipe 18 extends into the preheating chamber 1 to remove poisonous gas which could be present inside the preheating chamber 1. The direction of flow of the exhaust gas is indicated by arrow 20.

The quartz powder 10 thus heated was tumbled and transferred to the reaction chamber 2 by passing the sectioning plate 5. The sectioning plate 5 is made in form of a ring having a central hole and an outer diameter which is smaller than the inner diameter of the rotary kiln 4 and therefore leaving a gap between the sectioning plate 5 and the inside wall of the rotary kiln 4. The quartz powder 10 is transferred to the reaction chamber 2 through the central hole as well as through the gap.

Inside the reaction chamber 2 the powder 10 was further heated to about 1,270° C. At the same time, the quartz powder 10 was brought into contact with a mixed gas comprising gaseous hydrogen chloride and gaseous chlorine whose flow rate was set at a ratio of the former to the latter of 1 to 0.075 l/min (13:1) to effect purification. The mixed gas was supplied to the reaction chamber 2 by a pipe 13, which extends along the central axis from one side of the rotary kiln 4 to the reaction chamber 2 thereby passing the central hole 8 of the sectioning plate 6. The direction of flow of the mixed gas is indicated by arrow 14.

The quartz powder 10 thus purified was transferred to the gas desorption chamber 3 maintained at a temperature of 800° C., and was gradually cooled to remove the gas absorbed on the surface of the quartz powder 10. An outlet of the exhaust pipe 15 for the desorbed gas was provided to the gas desorption chamber 3, and a ventilation means (not shown in the FIGURE) was connected to the exhaust pipe 15 to accelerate the gas desorption. The direction of flow of the exhaust gas is indicated by arrow 16.

The powder 10 left the gas desorption chamber 3 via a flowing out hole which is connected to a outlet pipe 17

The refining process was operated continuously for a duration of 2 hours to obtain about 10 kg of high purity quartz powder 10. The chemical analysis on the purified quartz powder yielded the results as summarized in Table 1.

EXAMPLE 2

A powder of naturally quartz was purified in the same manner as in Example 1, except for using a mixed gas comprising gaseous hydrogen chloride and gaseous chlorine whose flow rate is set at a ratio of the former to the latter of from 1 to 0.25 l/min (4:1). The chemical analysis on the purified quartz powder yielded the results as summarized in Table 1.

COMPARATIVE EXAMPLE 1

A powder of naturally quartz was purified in the same manner as in Example 1, except for setting the temperature of the pre-heating chamber to 500° C., The chemical analysis on the purified quartz powder yielded the results as summarized in Table 1.

COMPARATIVE EXAMPLE 2

A powder of naturally quartz was purified in the same manner as in Example 1, except for setting the temperature of the reaction chamber to 900° C. The chemical analysis on the purified quartz powder yielded the results as summarized in Table 1.

COMPARATIVE EXAMPLE 2

A powder of naturally quartz was purified in the same manner as in Example 1, except for using a mixed gas comprising gaseous hydrogen chloride and gaseous chlorine at a mixing ratio by volume of the former to the latter of 23 to 1. The chemical analysis on the purified quartz powder yielded the results as summarized in Table 1.

sodium, potassium, and transition metal elements of a quartz powder. It also removes alkaline earth metal elements such as magnesium and calcium from the quartz powder.

The refining process according to the present invention decreases the concentration of impurities in a quartz powder, particularly that of a powder of naturally occurring quartz. More specifically, the refining process according to the present invention not only lowers the impurity concentration of alkali metal elements such as sodium and potassium to a favorable level, but also reduces the concentration of alkaline earth elements such as magnesium and calcium to a sufficiently low level. Moreover, the process according to the present invention is industrially useful; because the refining process according to the present invention can be operated continuously, it yields high purity quartz powder at a low cost and at high productivity.

We claim:

1. A process for continuously refining quartz powder inside a rotating cylindrical quartz glass tube, wherein the rotating cylindrical quartz glass tube is partitioned into at least three chambers comprising a pre-heating chamber, a reaction chamber, and a gas desorption chamber by means of a section plate between each two adjacent chambers, said section plates each having an opening and wherein said process comprises pre-heating the starting quartz powder by continuously supplying it into the pre-heating chamber, refining the powder by transferring it into the reaction chamber in which the powder is brought into contact with a chlorine-containing gas atmosphere, and transferring the powder into the gas desorption chamber.

2. A process for continuously refining quartz powder as in claim 1 wherein the opening in each said section plate has an area which is from 10 to 40% of the area of entire plate.

3. A process for continuously refining quartz powder as claimed in claim 1, wherein, the temperature in the pre-heating chamber is 800° C. or higher, and the temperature in the reaction chamber is in the range of from 1,000° to 1,300° C.

4. A process for continuously refining quartz powder as in claim 1 wherein the chlorine-containing gas atmosphere supplied into the reaction chamber is pre-heated.

5. A process for continuously refining quartz powder as claimed in claim 1, wherein, the temperature of the gas desorption chamber is set to 800° C. or higher.

6. A process for continuously refining quartz powder as claimed in claim 1, wherein, the opening in the sectioning

TABLE 1

| | (unit:ppb) | | | | | | | | | |
|---|---|---|---|---|---|---|---|---|---|---|
| | Na | K | Li | Mg | Ca | Al | Fe | Cu | Ni | Cr |
| Starting Material | 1100 | 1050 | 710 | 32 | 370 | 16000 | 410 | 9.5 | 7.2 | 14.0 |
| Example 1 | <10 | 110 | 710 | 29 | 360 | 16000 | 60 | <0.3 | <0.3 | <0.5 |
| Example 2 | <10 | 80 | 700 | 9 | 120 | 16000 | 30 | <0.3 | <0.3 | <0.5 |
| Comp. Ex. 1 | 80 | 200 | 710 | 31 | 370 | 16000 | 180 | 1.1 | 0.9 | 1.8 |
| Comp. Ex. 2 | 410 | 380 | 700 | 31 | 360 | 16000 | 150 | 5.1 | 3.8 | 7.7 |
| Comp. Ex. 3 | 30 | 200 | 710 | 32 | 370 | 16000 | 150 | 0.8 | 0.5 | 1.1 |

As shown in Table 1, the refining process according to the present invention favorably lowers the concentration of plate between the reaction chamber and the gas desorption chamber is substantially clogged by the purified quartz powder.

7. A process for continuously refining quartz powder as in claim 1, wherein, a ventilation means is connected to a desorption gas exhaust pipe whose end is opened in the gas desorption chamber.

8. A process for continuously refining quartz powder as claimed in claim 1, wherein, the chlorine-containing gas is a mixed gas comprising gaseous hydrogen chloride and gaseous chlorine at a volume ratio of the former to the latter in a range of from 2:1 to 20:1.

9. Process as in claim 1 wherein said section plates are made of quartz glass.

* * * * *